(12) United States Patent
Gasthaus et al.

(10) Patent No.: US 6,889,377 B1
(45) Date of Patent: May 3, 2005

(54) SYSTEM AND METHOD FOR UNIFORMLY ADMINISTERING PARAMETERS FOR A LOAD DISTRIBUTION AND LOAD CONTROL OF A COMPUTER PLATFORM

(75) Inventors: Elisabeth Gasthaus, München (DE); Jörg Oehlerich, Stockdorf (DE); Walter Held, Geretsried (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/623,375

(22) PCT Filed: Mar. 3, 1999

(86) PCT No.: PCT/EP99/01377

§ 371 (c)(1),
(2), (4) Date: Sep. 1, 2000

(87) PCT Pub. No.: WO99/45466

PCT Pub. Date: Sep. 10, 1999

(30) Foreign Application Priority Data

Mar. 4, 1998 (EP) .............................................. 98103827

(51) Int. Cl.$^7$ ................................................ G06F 9/00
(52) U.S. Cl. ........................ 718/105; 718/102; 709/203; 709/223
(58) Field of Search ................................ 709/100, 101, 709/102, 103, 104, 105, 203, 204, 223, 224, 225; 718/100

(56) References Cited

U.S. PATENT DOCUMENTS

| | | | | |
|---|---|---|---|---|
| 5,335,323 A | * | 8/1994 | Kolnick ...................... | 345/765 |
| 5,537,596 A | | 7/1996 | Yu et al. | |
| 5,603,028 A | * | 2/1997 | Kitsuregawa et al. ....... | 709/105 |
| 5,655,120 A | * | 8/1997 | Witte et al. ................. | 709/105 |
| 6,119,122 A | * | 9/2000 | Bunnell ...................... | 707/102 |

FOREIGN PATENT DOCUMENTS

EP 0 346 039 12/1989

* cited by examiner

*Primary Examiner*—Majid A. Banankhah
(74) *Attorney, Agent, or Firm*—McCormick, Paulding & Huber LLP

(57) ABSTRACT

A system and method for uniformly administering parameters for a load distribution and load control of a computer platform includes a processor and a storage mechanism. Software components run on the processor, and include a manager component, which is a load model manager, that uniformly administers parameters for a load distribution and load control of the system. The platform further includes a catalog stored in the storage mechanism via which the load model manager administers the parameters. The catalog includes a plurality of tables. Each of the tables respectively includes a load model which is a complete, consistent set of parameters that influence the load distribution of the load control of the computer system.

14 Claims, 2 Drawing Sheets

SYSTEM AND METHOD FOR UNIFORMLY ADMINISTERING PARAMETERS FOR A LOAD DISTRIBUTION AND LOAD CONTROL OF A COMPUTER PLATFORM

BACKGROUND OF THE INVENTION

Field of the Invention

The invention relates to a platform and method of using this platform of a computer system for managing the load control and load distribution within the system.

The document European Patent EP-A-0 346 039 discloses a computer system that administers parameters for a load distribution and load control of a computer system.

A switching node is a computer system that processes jobs in a context of delay times that are demanded by the customer and by international standards. For broadband switching nodes, these jobs lie in very different areas, with different delay time demands, and deal with traffic volume of a very different type that fluctuates over time. In addition to coming from switching technology for data and voice traffic, these jobs come from task areas like protocol processing (for example, Common Channel Signaling System No. 7 (CCS-7) signalling, broadband User Network Interface (broadband subscriber signaling) (UNI)-interface, broadband Network Network Interface "variable-bandwidth trunk" signaling (NNI)-signalling, Global Title Translation, Private Network Network Interface (PNNI) protocol, Public Access Interface, Private Branch Exchange Access, etc.), management of the signalling networks (particularly for network outages), operation of the operator interface, billing, traffic statistics, administration of subscriber lines, line circuits, routing data and tariff zones, as well as from error handling, which assures that the "down time" (time during which the entire switching node or sub-components are not available) is minimized.

Since this computer deals with network connections, both normal and other operating conditions (e.g., initialization in which a network-wide communication is triggered) that must proceed in an optimally timely manner. The delay demands thus vary with the operating conditions, requiring an adequate reaction.

The real-time behavior needed from the switching node makes specific demands of the node architecture and of the operating system. To provide such real-time behavior, the processor run time capacities must be distributed as well as possible onto the various application programs at all times.

In the new Asynchronous Transfer Mode (ATM) switching node, time budget values are made available to the operating system in order to guarantee this, so that the OS can guarantee a minimum access time to the processor for the various applications.

Since telecommunication networks are subject to constant change with respect to performance features, architecture and size, the switching nodes in telecommunication networks must be flexible in terms of the functionalities that they offer and must be scalable in size.

In particular, a switching computer must be able to grow, with minimal/no interruptions in operation: this includes a HW upgrade for increasing the processor performance that already exists, a SW upgrade for upgrading performance features, and (in conjunction with these upgrades under certain circumstances) a redistribution of the time budget at the processor, including other parameters (e.g., load thresholds for the load control, scan intervals, and protocol budgets), these parameters should be capable of being changed interruption-free.

Up to now, these parameters were distributed among the various users, i.e., the parameters were declared in the application programs. The interface administration with respect to the parameters likewise took place by the users.

The totality of the load control parameters and load distribution parameters ("load control parameters") are approximately four-digits in length and are fundamentally important for the load distribution (time division onto the various applications according to the throughput and delay time demands, with many but not all of these being used for scheduling) and load control. The previous distributed deposit of these load control parameters at the various users and their administration by them (via a corresponding plurality of user interfaces) would lead to a considerable, if not insoluble, engineering problem. This problem would be in implementing a situation-suited adaptation (in the configuration and the run time) of the currently valid parameter values for the purpose of optimum load distribution and load control.

SUMMARY OF THE INVENTION

The present invention is based on the object of solving the above problem.

The solution is achieved by a load model manager that uniformly administers the parameters that influence the load control and the load distribution of the system and, thus, the performance of the system in a "load model catalog".

BRIEF DESCRIPTION OF THE DRAWINGS

An exemplary embodiment of the invention is described in greater detail below on the basis of the drawings.

Figure 1:
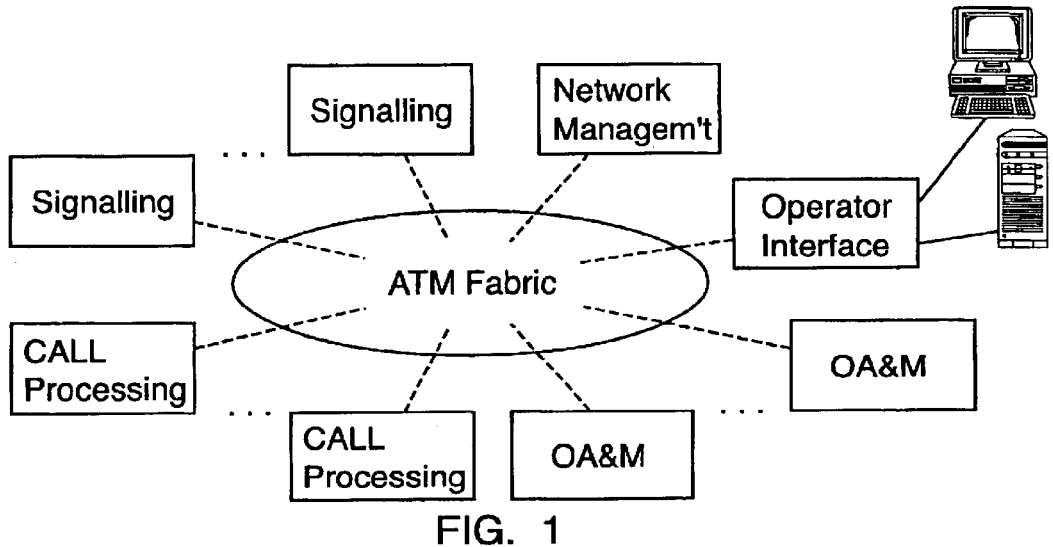
FIG. 1 is a schematic illustration of the invention using an exemplary ATM node.

The architecture utilizing an exemplary ATM node is presented first with reference to FIG. 1.

The most important control of the broadband node is implemented in a scalable cluster of main processors. All processors communicate with a shared, internal protocol via an ATM switching network (ATM fabric). An individual main processor with its share of the overall software of the system is referred to below as a platform.

The cluster under consideration in this example can be comprised of 128 individual platforms in its maximum configuration. Hardware and basic software (for example, operating system and load control software) are the same for all platforms. I.e., this base configuration must correspond to the demands of all known usage types/applications. At the same time, it must also be so comprehensive that a demand for new uses (potentially unknown at the present time) can be efficiently accommodated at any time. These usage types can be realized by various application software packets on the platforms. There are platforms for:

Call processing (can be multiply present in the node)

Protocol conversions (can be multiply present in the node)

Operation, administration and maintenance (can be multiply present in the node)

Management of the network signaling (is present exactly once in the node)

Operator interface (is present exactly once in the node).

The totality of software present on a platform for the above tasks, including basic software, is also referred to as "load type". Beyond these "pure" load types, platforms having "combined load types" must also be offered so that minimal configurations can be offered customized and cost-beneficially. It is precisely these platforms that are a challenge for the careful matching of the guaranteed minimal running time budget of the applications, since the competition, particularly of different types of user programs, for the allocation of the processor run time is greatest in this situation.

The operating system and the load control are explained in greater detail below.

Process Term and CHILL

The applications discussed above are realized as processes and are also referenced as such below. A run time-related unit is understood here as a process. The process has a runnable software unit that has attributes; those that influence its access right to the processor are of primary interest. These attributes are statically implemented. The process with its attributes is verbally explained (Commitee Consultatif de Telephonie et Telegraphie High Level Language —CHILL) and compiler-supported. Upon system start-up, the processes are offered in a form suited to the operating system, that takes their attributes into consideration.

The two attributes of the processes important for the real-time behavior determine:
1) the affiliation to a task group, and
2) the affiliation to a category of delay time demands within this task group.

The task groups of those units for which a minimum access time to the processor of the platform on which they reside is guaranteed.

The category of the delay time demands of a process within a task group determines the way that processes that belong to the same task group on the same platform compete for calculating time when they are simultaneously ready to run. This attribute, which distinguishes the processes within a task group, is what is referred to as the process priority (see below under the section "scheduling").

Operating System Part: Service Addressing

When a great system expansion of a node occurs, it is desirable to distribute the requests onto the cluster such that optimally no individual platform is overworked. The operating system part called "service addressing" assumes this task.

The operating system of each and every platform knows all functions offered and addressable in the entire cluster as "services". A service can be offered on the platform on which it is requested and/or on one or more other platforms of the cluster. In order to avoid the communication overhead between the platforms, the requesting user is informed of the response address of the service of its own platform—if present. When, however, this platform is in an overload condition (also see the section "load control" below), then a different platform in the cluster is selected that also offers this service, insofar as such a different platform is in a lower load condition. This is possible because a current load image of the overall cluster is situated on every platform.

Operating System Part: Scheduling

For a minimal configuration of the cluster, the computer capacity of an individual processor must be carefully distributed onto the applications.

To that end, the operating system of each and every platform must support the processes that compete for calculating time on one and the same platform, particularly under high load, such that it can adhere to the real-time demands at the switching nodes. In order to enable this, the processes are combined into task groups.

Figure 2:
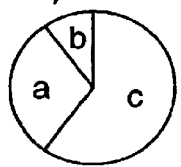
FIG. 2 is a task sequence diagram showing process scheduling.
Figure 2:
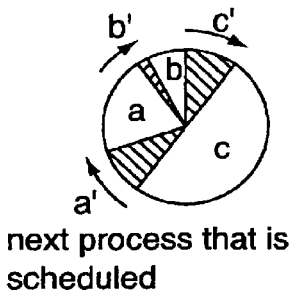
Figure 2:
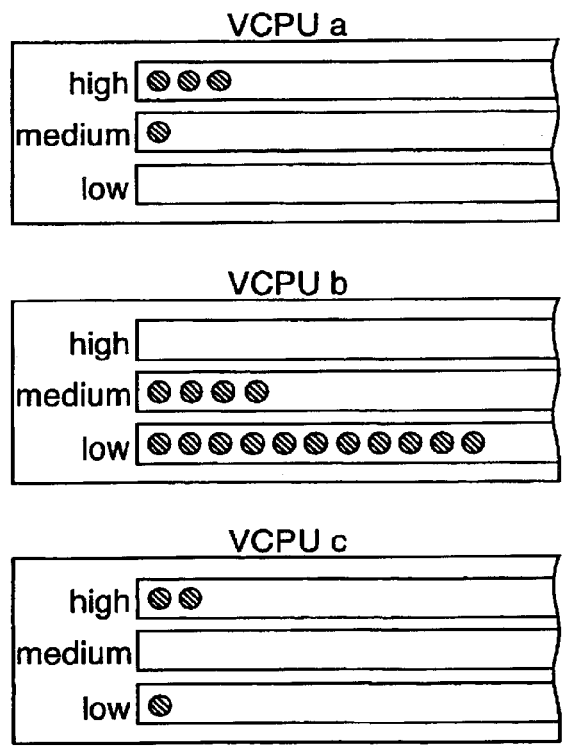

FIG. 2 shows an example of the scheduling of the processes. A guaranteed minimum part of the processor time is defined as a "run time budget" (i.e., net calculating time) for each of the task groups by load control parameters. These task groups are therefore also referred to as "virtual CPUs" (VCPU). The processes are assigned to a FIFO waiting list per VCPU and priority, and wait there for allocation of the CPU.

The scheduling routine works by time slicing and within time slices. At the beginning of each and every time slot, it observes a time credit account per VCPU in that it compares the sum of all measured running times of the processes of a VCPU to the guaranteed time budget. The result of this comparison is a VCPU-individual time credit.

In the VCPU having the greatest time budget, that waiting process that is waiting at the first location of the waiting list having the highest priority is the first to receive calculating time (see FIG. 2).

When the process is suspended during this time slot, then the next process from the same VCPU (and, potentially, from the same waiting list) follows. When no other process is waiting from this VCPU, then the scheduling algorithm performs as it did at the beginning of the time slot. At the beginning of the next time slot, the scheduling algorithm is applied anew.

Load Control

The load control SW cyclically compares the current load situation of its own platform to platform-individual thresholds and potentially identifies the processor as being in an overload condition. The overload condition is established for a processor when the offered, total load lies higher than the load thresholds that are established for this processor. This load information is distributed system-wide, so that the service addressing is in the position to "spare" overloaded platforms.

As soon as a processor is in the overload condition, the load control also determines, on the basis of the run time budget of the VCPUs, which of these VCPUs has exceeded its budget. These VCPUs are then referred to as overloaded. Suitable processes within these overloaded VCPUs are informed and requested to reduce their load offering to the processor.

According to the above-presented MP operating system structure of the ATM switching node, both the load control as well as the process scheduling in the operating system work with a number of load control parameters in order to create the pre-conditions for an optimum real-time behavior. Since operating system and load control are generic (i.e., uniform) for all MP platforms, these data for all possible function configurations of a platform must be available on each MP. Moreover, they must be "activatable" interactively on the platform (e.g., during the configuration) in order to take the function configuration into account. Furthermore, the data must be adapted to the respective operating condition (e.g., recovery) of the platform in order to optimally respond to the various demands of these operating conditions.

Load Model Management

The illustrated demands and mechanisms such as scalability of the network node, distribution of the load offering onto the platforms, division of the computer capacity of a platform onto the various users, a process concept with static process attributes, as well as the load control are still not all of the mechanisms that are related to the load control parameters. Over and above this, there are also clock information, run time limitations for the internal protocol, considerations related to the basic load and further sub-budget divisions and thresholds that are not discussed here.

When one considers the quantity and complexity of the load control parameters as well as the request profile and function fabric in which they reside, it becomes clear that it is necessary to implement them in surveyable fashion and to have them controlled by their own software.

All parameters that influence the load control and the load distribution of the system are therefore stored in a catalog replicated on each platform. This creates a surveyability that is particularly important when the change at one of the parameters interferes with the values of other parameters in the design phase. At the run time, only a single management function (LM Manager) still has access to this catalog, which also maintains the interfaces to the parameter users. This management function is also receptive for triggers that can request changes of the currently valid parameters via defined interfaces at the run time (for example, via interactive commands by the user). It bears the responsibility for informing all users affected by the changes. The structure of the parameter catalog is selected such that online changes of the valid parameters are meaningfully limited. An engineering of the complex influencing quantities is possible and can be implemented error-free only on the basis of this form of the management and the structuring.

The load management model structures the complex and extensive multitude of load control parameters in a way that, on the one hand, assures the surveyability for the purpose of engineerability, including error-free implementability. On the other hand, however, a flexibility is also enabled that envelopes pre-conditions for a situation-suited adaptation (in the configuration and at the run time) of the currently valid parameter values for the purpose of optimum performance in view of load distribution and load control.

Interactively, only a single table can be selected and "activated" from the parameter catalog at one time, and thus no value from another table of the catalog can be employed (as long as this table is "active"). Changing operating conditions of the platform can in turn select only among pre-fabricated data sets and change between these.

Figure 3:
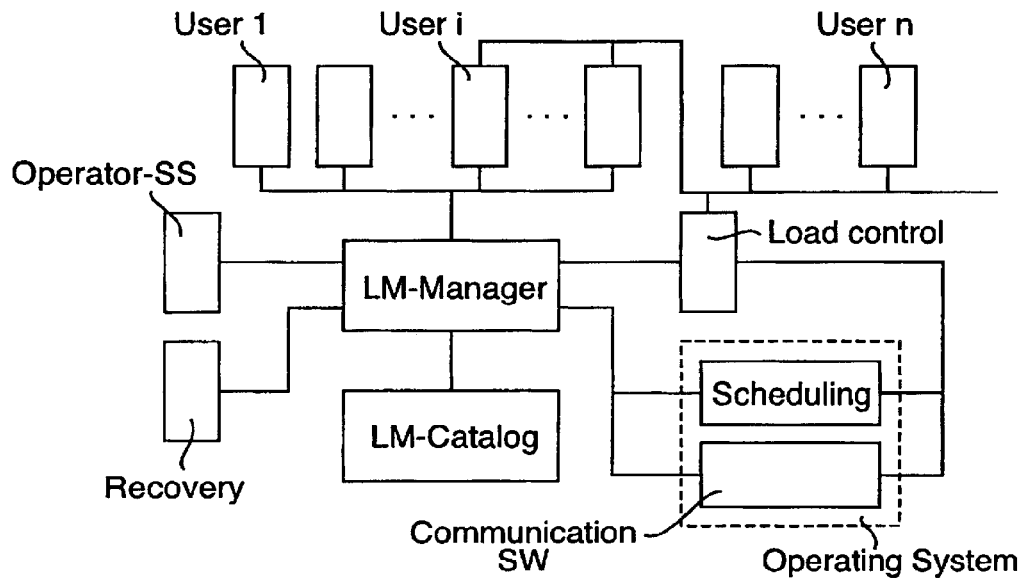
FIG. 3 is a block diagram showing the relationship of the load model manager for various components within the system.

FIG. 3 shows the relationships of the load model manager for various components within the system. There are three different types of users of the LM manager. A first user type (user 1) is only in communication with the LM manager. The recovery component is cited as an exemplary user of this type. A second user type (user i) is in communication both with the LM manager as well as with the load control; the scheduling component is to be cited as an exemplary user of this type. Finally, third user (user n) only receives values from the load control; the switching technology component is cited as an exemplary user of this type.

Operator Interface

Each individual platform of the duster must be configured, for example upon initialization of the switching node. This means:

1) that the load type is allocated and loaded and
2) that a load model table is selected from the load model catalog replicated on all platforms.

The type of organization of the central load control parameters in the load model catalog is discussed in greater detail in the section "load model catalog".

A load model table from the load model catalog is clearly allocated to a load type, by which a plurality of tables can be present for one load type (for example, for different load expectations or operating conditions).

After the selection of the table, only the values recited in it, which represent a consistent set of parameters, are then valid until the interruption-free replacement of this table. This denotes a meaningful limitation that facilitates operation of the node for the user and provides him with the security of always placing parameters matched to one another into operation. The selection possibility from various load model tables provides him with the possibility of tuning the platforms.

The operator can establish suitable VCPU budgets at the various VCPUs dependent on the load anticipation. Since he can replace the currently valid load model table interruption-free during operation, the budgets can be unproblemmatically adapted to modified conditions (for example, due to a HW or SW upgrade in the node).

Values within a table can be changed by a SW patch that can be checked for consistency and supplied by the manufacturer. An operator command can then select the patched table free of operating interruptions (see FIG. 3), and the control software (load model management) takes care of informing the affected applications.

Figure 4:
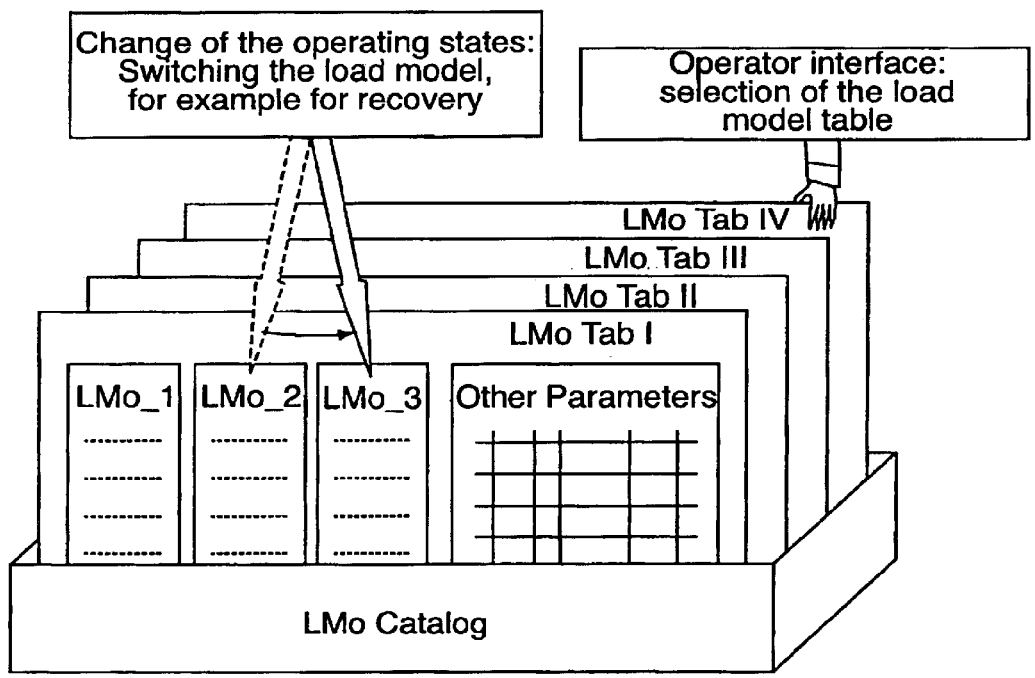
FIG. 4 is a data structure diagram illustrating the load model catalog.

For coordination of the selection, see the section "control software" below and FIG. 4.

Load Model Catalog

The load model catalog represents the organization structure of those load model parameters that are centrally implemented. In contrast to this, process attributes, of course, are decentrally declared at every individual process; see the above section "process term."

The load model catalog is composed of individual load model tables that can be interactively allocated to each platform (see the section "operator interface").

Each load model table from the load model catalog contains, first, a plurality of load models that contain the budgets to be guaranteed for the VCPUs. Various load models are required in order to be able to take the different demands of the platform operating conditions (such as startup or normal operation) into account.

Second, the load model table also contains the clock information, overload limits and run time limitations for sequencing the internal protocol, the size of the load reserve, the basic load as well as a table that supports the allocation of the processes onto the VCPUs.

Control Software (Load Model Manager)

The control SW (load model management or management component) is an operating system-proximate process that sees to the readout of the correct parameter data upon initialization or platform status changes.

The load model (LM) manager enables the interruption-free replacement of the currently valid load model parameters. To that end, it makes interfaces for the events to be triggered available. Furthermore, it informs the SW affected by this event. The operating system as well as processes such as the load control belong to this SW. When, due to the replacement of the load model table, the budget is completely withdrawn from a VCPU, then, of course, the appertaining service must also be withdrawn.

Depending on the internal operating condition of the appertaining platform, one or the other load model is applied. When, for example, a recovery occurs during operation (also see FIG. 3 or 4), then recovery can turn to load management so that a switch is made from normal operating load model to a specifically recovery load model, so that the modified runtime demands of recovery are taken into account. Load model management independently informs the SW affected by this event such as, for example, scheduling and the load control.

What is claimed is:

1. A computer system platform, comprising:
   a processor;
   a storage mechanism;
   software components that run on said processor, comprising a manager component, which is a load model manager, that uniformly administers parameters for a load distribution and load control of said computer system;
   said platform further comprising:
   a catalog stored in said storage mechanism via which said load model manager administers said parameters, said catalog comprising a plurality of tables, each of said tables respectively comprising a load model which is a complete, consistent set of parameters that influence said load distribution and said load control of said computer system.

2. The platform according to claim 1, wherein one of said tables can be defined as a currently valid table assisted by said load model manager.

3. The platform according to claim 2, wherein a selection accomplished by said definition of said table is dependent on a load type of a platform.

4. The platform according to claim 2, wherein a selection accomplished by said definition of said table is dependent on an operating condition of a platform.

5. The platform according to claim 2, further comprising an interface to said load model manager via which said definition of said table can be triggered.

6. The platform according to claim 2, wherein said load model manager comprises interfaces to said software components of via which said load model manager informs said software components of currently valid load control parameters from said currently valid table.

7. The platform according to claim 2, wherein said load model manager comprises an interface via which a system manufacturer can modify content of a table during operations.

8. A method for uniformly administering parameters for a load distribution and load control of a computer system platform having a processor, comprising the steps of:
   storing a catalog in a storage mechanism of said platform;
   providing a plurality of tables in said catalog;
   providing a load module in each of said plurality of tables, said load module having a consistent set of parameters that influence said load distribution and said load control of said computer system;
   uniformly administering parameters for said load distribution and said load control by a load model manager software component that runs on said processor, utilizing said stored catalog.

9. The method according to claim 8, further comprising the step of defining one of said plurality of tables as a currently valid table assisted by said load model manager.

10. The method according to claim 9, wherein said step of defining a currently valid table is dependent on a load type of a platform.

11. The method according to claim 9, wherein said step of defining a currently valid table is dependent on an operating condition of a platform.

12. The method according to claim 9, further comprising the steps of:
    providing an interface to said load model manager; and
    triggering said step of defining said currently valid table via said interface.

13. The method according to claim 9, further comprising the steps of:
    providing interfaces between said load model manager and software components of said platform;
    informing, by said load model manager, said software components of currently valid load control parameters from said defined currently valid table.

14. The method according to claim 9, further comprising the steps of:
    providing an interface for said load model manager;
    modifying, by a system manufacturer via said interface, content of one of said tables during operations.

* * * * *